US012484547B1

(12) United States Patent
Patnode et al.

(10) Patent No.: US 12,484,547 B1
(45) Date of Patent: Dec. 2, 2025

(54) ADJUSTABLE FENCING

(71) Applicants: Jeffrey Patnode, Box Elder, SD (US); Donna Patnode, Box Elder, SD (US)

(72) Inventors: Jeffrey Patnode, Box Elder, SD (US); Donna Patnode, Box Elder, SD (US)

(*) Notice: Subject to any disclaimer, the term of this patent is extended or adjusted under 35 U.S.C. 154(b) by 0 days.

(21) Appl. No.: 18/904,167

(22) Filed: Oct. 2, 2024

(51) Int. Cl.
*A01K 3/00* (2006.01)
*E04H 17/18* (2006.01)
*E06B 9/06* (2006.01)

(52) U.S. Cl.
CPC .......... *A01K 3/001* (2021.08); *E04H 17/185* (2021.01); *E06B 9/0661* (2013.01)

(58) Field of Classification Search
CPC ...... E04H 17/185; E01K 3/001; E06B 9/0661
See application file for complete search history.

(56) References Cited

U.S. PATENT DOCUMENTS

| | | | | |
|---|---|---|---|---|
| 172,852 | A | * | 2/1876 | Frazee .................. E06B 9/0661 |
| | | | | 160/136 |
| 447,102 | A | * | 2/1891 | Bushman .............. E06B 9/0661 |
| | | | | 160/161 |
| 3,148,725 | A | * | 9/1964 | Mcphaden ............. E06B 9/0623 |
| | | | | 160/217 |
| 4,669,521 | A | * | 6/1987 | Barnes .................. E06B 9/0623 |
| | | | | 160/136 |
| 5,704,592 | A | | 1/1998 | White et al. |
| 6,233,874 | B1 | * | 5/2001 | Johnson, Jr. ........ E05B 65/0007 |
| | | | | 49/55 |
| 10,563,367 | B2 | | 2/2020 | Reid |

FOREIGN PATENT DOCUMENTS

| | | | | | |
|---|---|---|---|---|---|
| CA | 2233760 | A1 | * | 11/1999 | .............. E01F 13/02 |
| CN | 114458078 | A | * | 5/2022 | ............. E04H 17/00 |
| GB | 685172 | A | * | 12/1952 | ........... E06B 9/0661 |

* cited by examiner

*Primary Examiner* — Matthew R McMahon
(74) *Attorney, Agent, or Firm* — Dale J. Ream (57) ABSTRACT

A modular livestock fencing system includes a plurality of collapsible modular fence units configured to house and control egress for livestock. Each collapsible modular fence includes two posts perpendicular to the ground and a plurality of rotatably supporting members connecting the two posts such that each rotatable supporting member can be rotated in a scissor motion to bring the two posts toward one another into a fully collapsed position where the posts are substantially in contact with one another or an expanded configuration where the posts are displaced from one another in a fully extended position. The system may include a locking mechanism which locks the supporting members at the fully extended position. The system includes a plurality of connection elements located on the two posts that are configured to connect one modular fence unit with one or more additional modular fence units.

7 Claims, 7 Drawing Sheets

ADJUSTABLE FENCING

BACKGROUND OF THE INVENTION

I. Field of the Invention

This invention relates generally to livestock fencing, and more particularly, to modular fence units that can be coupled together and used for controlling egress of livestock.

II. Description of Related Art

U.S. Pat. No. 5,704,592 discloses an expandable safety barrier with a multiplicity of interconnected elements in a lattice structure. The interconnected elements perform a scissor action during expansion and retraction.

U.S. Pat. No. 10,563,367 discloses a portable roadside barrier with a plurality of supporting members, commonly referred to as an accordion gate.

CN Patent No. 114458078 discloses a telescopic fencing device with a lattice structure of interconnected elements. Relaxation limit of the interconnected elements can be partially adjusted to change fence length.

CA Patent No. 2,233,760 discloses an extendable security barrier with interconnecting elements that open and close with a scissoring motion.

WO Publication No. 2018/086007A1 is directed to a folding road barrier fence with arc shaped bases and interconnecting elements that fold along a central joint.

III. Background

This invention relates generally to livestock fencing, and more particularly, to modular fence units that can be coupled together and used for controlling egress of livestock.

Fencing is critical to livestock management, serving to confine animals within a designated area, protect them from predators, and prevent them from straying into hazardous or off-limit zones. Traditional methods of fencing, such as barbed wire and wooden post-and-rail fences, have been widely used throughout history. But while these stationary fences have proven effective, they come with certain obvious limitations. Once installed, these fences are permanent, making it difficult to adapt to changing pasture layouts or rotational grazing systems. Moreover, installation and maintenance require significant labor and time, and transporting materials can be logistically challenging and costly.

An advantageous alternative to traditional fencing methods would be the invention and development of modular fencing consisting of units that could be coupled together to form a continuous fence line. When expanded, the support members of the fence would cross in a scissor or accordion manner, allowing the fence to stretch out and form a solid barrier. A key feature of these modular fences would be the inclusion of a locking upper rail, which would provide additional structural integrity and make the fence especially suited for livestock control. This innovative type of fencing would be especially advantageous due to its portability, flexibility, and ease of installation. Modular fences could be quickly set up, taken down, or reconfigured to create different pasture sizes, temporary enclosures, or holding pens for veterinary procedures.

Collapsible fences and gates are already being put to use, particularly as road and safety barriers as shown in the prior art. Similar to the adjustable fencing being discussed, these barriers expand and collapse in a scissor or accordion manner. However, the current invention is clearly set apart by the inclusion of a locking upper rail, which makes this type of fencing superior to other collapsible fences for the purpose of holding livestock. Livestock are less likely to attempt to jump over a fence with a consistent upper limit than a fence with high and low points; this is particularly true of larger animals such as cattle and horses. The upper rail also acts as a clear visual boundary for the animals, helping to prevent accidental breaches in low-light conditions when animals might not see a lower, less defined fence line.

SUMMARY OF THE INVENTION

In some aspects, the techniques described herein relate to a modular fence unit, including: a first post and a second post each generally perpendicular to the ground at a use configuration, each post including: a hollow rectangular tube having a first sidewall with an opening therein and a second sidewall opposite the first sidewall; and at least two connection elements mounted within the rectangular tube and accessible through the opening, wherein the connection elements are spaced apart from one another along a length of the rectangular tube such that the post has an upper connection element and a lower connection element; a first support member and a second support member diagonally disposed from one another, wherein: a first end of the first support member is operably fastened to the upper connection element of the first post; a second end of the first support member is operably fastened to the lower connection element of the second post; a first end of the second support member is operably fastened to the lower connection element of the first post; a second end of the second support member is operably fastened to the upper connection element of the second post; the first and second support members are connected via a support member connection fastener which connects the first and second support members at a central point located between the first and second posts, such that the first and second posts are kept substantially parallel to one another and the first and second support members are kept in contact; the support members are configured to rotate around each connection element and the support member connection fastener, such that a relative angle between the diagonally disposed support members and the support member connection fastener can be increased or decreased in a scissoring motion; increasing the relative angle of the connection fasteners causes the first and second posts to contract toward each other until a minimum distance between the posts is reached; and decreasing the relative angle of the connection fasteners causes the first and second posts to extend away from each other until a maximum distance between the posts is reached; an upper rail support including: a first pivotal support member and second pivotal support member, wherein: a first end of the first pivotal support member is operably fastened to the upper connection element of the first post; a first end of the second pivotal support member is operably fastened to the upper connection element of the second post; a second end of the first pivotal support member and a second end of the second pivotal support member are operably fastened to one another at a central point between the two posts by a rail support connection fastener; and the first and second pivotal support members are configured to rotate around each connection element and the rail support connection fastener, such that: the maximum distance between the posts is constrained to a distance allowed by the first and second pivotal support members when the first and second pivotal support members are oriented generally parallel to the ground; and a minimum distance between the posts occurs when the first and second pivotal support members are not linearly aligned with one another; and a locking mechanism which selectively locks rotation of the pivotal support members and prevents the posts from contracting or expanding; and a fastener connection accessible at the second sidewall of the first post and a fastener connection accessible at the second sidewall of the second post, such that a plurality of modular fence units can be fastened together at one or more angles to form a customizable fence shape.

In some aspects, the techniques described herein relate to a modular fence unit, wherein a plurality of attributes of the modular fence unit posts can be modified to produce a plurality of modular fence types, the plurality of post attributes including dimensions and material strengths of the posts.

In some aspects, the techniques described herein relate to a modular fence unit wherein a plurality of attributes of the modular fence unit support members and pivotal support members can be modified to produce a plurality of modular fence types, the plurality of support member and pivotal support member attributes including dimensions and material properties of the members.

In some aspects, the techniques described herein relate to a modular fence unit, wherein one or more fence types are determined according to one or more use requirements for housing and controlling egress of a type and/or number of animals.

In some aspects, the techniques described herein relate to a modular fence unit, wherein the minimum distance between the posts is a fully collapsed position where the posts are substantially in direct contact.

In some aspects, the techniques described herein relate to a modular fence unit, wherein the modular fence unit in a fully collapsed position can be stacked, such that a plurality of modular fence units can be transported in a space-efficient configuration.

In some aspects, the techniques described herein relate to a modular fence unit, wherein at least one the fastener connection is a circular connection fastener.

In some aspects, the techniques described herein relate to a locking mechanism, wherein the locking mechanism is a hollow rectangular element slidable from one the pivotal support member to cover both the pivotal support members at the location of the rail support connection fastener when the posts are at the maximum distance away from one another.

In some aspects, the techniques described herein relate to a modular fence unit, wherein the connection element is a bolt or pin, which is inserted through a series of spacers and concentric holes on one or more components of the modular fence unit.

In some aspects, the techniques described herein relate to a method of assembling a modular fence, including: transporting a plurality of modular fence units in a fully collapsed position to a worksite, where the plurality of modular fence units are transported in a vehicle or trailer storage area, and wherein the modular fence unit includes: two posts oriented perpendicular to the ground; a plurality of rotatable supporting members connecting the two posts, where the rotatable supporting members can be rotated in a scissoring motion to bring the two posts toward each other into a fully collapsed position where the posts are substantially in contact with one another, or expand the posts away from each other into a fully extended position where the posts are at a maximum distance from one another; a locking mechanism which locks the supporting members into the fully extended position; a plurality of connection elements located on faces of the two posts which are opposite to the supporting members, the plurality of connection elements being configured to connect one modular fence unit with one or more additional modular fence units; performing a single unit deployment process, including: expanding one modular fence unit from the fully collapsed position, to a fully extended position, locking the modular fence unit in the fully extended position using the locking mechanism; repeating the single unit deployment process for additional modular fence units, wherein each newly deployed modular fence unit is fastened to one end of a previously deployed unit; fastening and arranging the plurality of modular fence units into a desired fence shape.

In some aspects, the techniques described herein relate to a method, wherein the modular fence is deployed into a fence shape for keeping livestock in a fixed area and/or for controlling egress of the livestock from the fixed area.

In some aspects, the techniques described herein relate to a method, further including a fence type selection prior to transport and deployment, wherein the fence type selection includes: selecting at least one modular fence type for use, from among a plurality of selectable modular fence types, according to a plurality of attributes, including: one or more dimensions and material strengths of the posts.

In some aspects, the techniques described herein relate to a method, further including a fence type selection prior to transport and deployment, wherein the fence type selection includes: selecting at least one modular fence type for use, from among a plurality of selectable modular fence types, according to a plurality of attributes, including: dimensions and material strengths of the supporting members.

In some aspects, the techniques described herein relate to a method, wherein selection of the fence type is made according to known requirements for housing and/or controlling egress of the livestock.

In some aspects, the techniques described herein relate to a method, further including a deconstruction process for disassembling the modular fence, including: a breakdown procedure for one of the modular fence units, including: disconnecting all fasteners which connect the modular fence unit to the total fence shape; disengaging the locking mechanism on the modular fence unit; contracting the posts of the modular fence unit until the unit is in a fully collapsed position; storing the modular fence unit for transportation or storage; and repeating the breakdown procedure for every modular fence unit until the modular fence is fully disassembled and stored.

In some aspects, the techniques described herein relate to a modular livestock fencing system, including: a plurality of collapsable modular fence units which are connected and arranged into a total fence structure configured to house and control egress for livestock, wherein each collapsable modular fence unit includes: two posts oriented perpendicular to the ground; a plurality of rotatable supporting members connecting the two posts, where the rotatable supporting members can be rotated in a scissoring motion to bring the two posts toward each other into a fully collapsed position where the posts are substantially in contact with one another, or expand the posts away from each other into a fully extended position where the posts are at a maximum distance from one another; a locking mechanism which locks the supporting members into the fully extended position; a plurality of connection elements located on faces of the two posts which are opposite to the supporting members, the plurality of connection elements being configured to connect one modular fence unit with one or more additional modular fence units.

In some aspects, the techniques described herein relate to a fencing system, wherein at least one of the plurality of connection elements are circular connection fasteners.

In some aspects, the techniques described herein relate to a fencing system, wherein the locking mechanism is a hollow rectangular element slidable over one or more support members to prevent rotation of the one or more support members.

In some aspects, the techniques described herein relate to a fencing system, wherein the plurality of modular fencing units include a particular type of fencing units, selected from among a plurality of different fencing unit types, wherein the plurality of fencing unit types include modular fencing units with different dimensions and/or material properties of the posts and support members.

In some aspects, the techniques described herein relate to a fencing system, wherein the particular type of fencing unit selected is selected according to known requirements for housing and/or controlling egress of the livestock which is contained in the fencing system.

DETAILED DESCRIPTION OF THE PREFERRED EMBODIMENT

Fencing is critical to livestock management, serving to confine animals within a designated area, protect them from predators, and prevent them from straying into hazardous or off-limit zones. Traditional methods of fencing, such as barbed wire and wooden post-and-rail fences, have been widely used throughout history. But while these stationary fences have proven effective, they come with certain obvious limitations. Once installed, these fences are permanent, making it difficult to adapt to changing pasture layouts or rotational grazing systems. Moreover, installation and maintenance require significant labor and time, and transporting materials can be logistically challenging and costly.

An advantageous alternative to traditional fencing methods would be the invention and development of modular fencing consisting of units that could be coupled together to form a continuous fence line. When expanded, the support members of the fence would cross in a scissor or accordion manner, allowing the fence to stretch out and form a solid barrier. A key feature of these modular fences would be the inclusion of a locking upper rail, which would provide additional structural integrity and make the fence especially suited for livestock control. This innovative type of fencing would be especially advantageous due to its portability, flexibility, and ease of installation. Modular fences could be quickly set up, taken down, or reconfigured to create different pasture sizes, temporary enclosures, or holding pens for veterinary procedures.

Collapsible fences and gates are already being put to use, particularly as road and safety barriers as shown in the prior art. Similar to the adjustable fencing being discussed, these barriers expand and collapse in a scissor or accordion manner. However, the current invention is clearly set apart by the inclusion of a locking upper rail, which makes this type of fencing superior to other collapsible fences for the purpose of holding livestock. Livestock are less likely to attempt to jump over a fence with a consistent upper limit than a fence with high and low points; this is particularly true of larger animals such as cattle and horses. The upper rail also acts as a clear visual boundary for the animals, helping to prevent accidental breaches in low-light conditions when animals might not see a lower, less defined fence line.

Therefore, it would be desirable to have modular fence units that can be coupled together and used for controlling egress of livestock. Further, it would be desirable for the fence units to include internal scissor members diagonally disposed so as to expand or retract in an accordion manner and a pivotal upper rail member. Even further, it would be desirable for the fence units to be collapsible to nothing more than a pair of posts that may be easily transported in a pickup truck or trailer.

Figure 1:
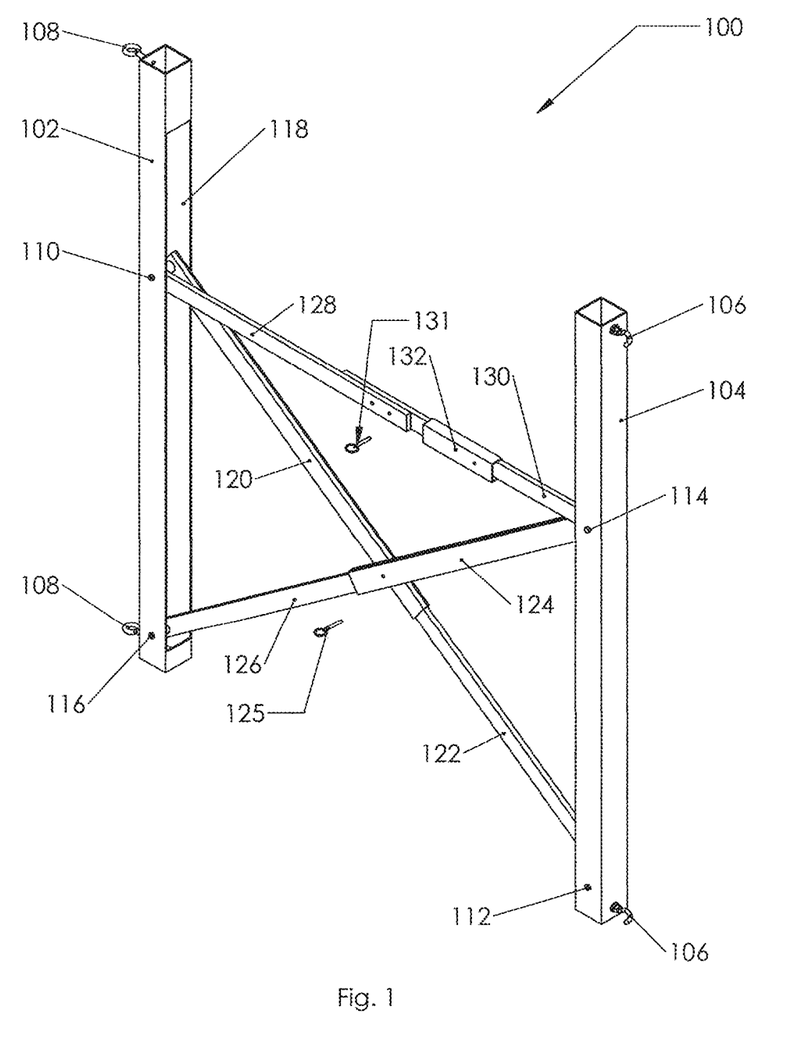
FIG. 1 is an isometric view of a fence unit according to an embodiment of the current invention.

A first embodiment of the invention is a modular fence unit 100 which is shown in FIG. 1. The modular fence unit 100 comprises a first hollow post 102 and a second hollow post 104 which extend lengthwise perpendicular to a ground surface, and which have at least one side which is substantially parallel to one another. A hollow tube opening 118 is situated on one face of the first hollow post 102 which faces the second hollow post, and an additional hollow tube opening 118 is located on the second hollow post 104 which faces the first hollow post 102. The hollow tube openings 118 allow for connecting members 120, 122, 124, 126, 128, 130, 132 to be operably fastened inside the hollow tube opening 118, where the members facilitate an opening and closing motion of the modular fence unit 100. During a closing operation, the connecting members 120, 122, 124, 126, 128, 130, 132 can be substantially entirely stored within the hollow tube openings 118 to allow for the posts 102, 104 to be substantially in contact with one another.

To facilitate fastening of the connecting members 120, 122, 124, 126, 128, 130, 132 inside the hollow tube opening 118, four pins 110, 112, 114, 116 are inserted into sets of concentric holes 144, 146, 148, 150 found on the first hollow post 102 and the second hollow post 104, respectively, in a direction parallel to the face of each hollow tube opening 118. A first pin 110 is located above a third pin 116, relative to the ground surface, in the first hollow post 102. A fourth pin 114 is located above a second pin 112, relative to the ground surface, in the second hollow post 104. In some embodiments, the pins 110, 112, 114, 116 are rounded fasteners, such as bolts with securing lock nuts, which allow connecting members 120, 122, 124, 126, 128, 130, 132 to freely rotate around the rounded fasteners. In other embodiments, the pins 110, 112, 114, 116 are any form of fastening connection which allows for operable fasting fastening of the connecting members 120, 122, 124, 126, 128, 130, 132 to the posts 102, 104 allowing for rotation of the members. To be clear, the fasteners described above may be referred to in the claims below as "support member connection fasteners."

The first of two types of connecting members are outer support members 120, 124 and inner support members 122, 126. An outer first support member 120 is operably fastened to the first pin 110 at one end. The outer first support member 120 partially surrounds a portion of an inner first support member 122 and is operably connected to the inner first support member 122, such that it can slide linearly to cover a greater portion of the inner first support member 122 during a closing operation of the modular fence unit 100. One end of the inner first support member 122, which is opposite the outer first support member 120, is operably fastened to the second pin 112. This sliding connection scheme is mirrored by an outer second support member 124 and an inner second support member 126 which are in sliding connection. The outer second support member 124 is operably fastened to the third pin 114 at one end opposite to the connection end between the support members 124, 126, and the inner second support member 126 is likewise operably fastened to the fourth pin 116 at one end opposite to the connection end between the support members 124, 126. The first support member (i.e., the combination outer first support member 120 and inner first support member 122) may be coupled to a second support member (i.e., the combination outer second support member 124 and inner second support member 126) with a fastener 125, such as a pin.

In some embodiments, the outer first support member 120 and the outer second support member 124 are also operably fastened together at a point which is equidistant between the first hollow post 102 and the second hollow post 104, such that the outer support members 120, 124 can freely rotate around the point. In alternate embodiments, the outer support members 120, 124 are not operably connected to one another.

A scissor type motion of the support members 120, 122, 124, 126 allows for a collapsing and opening motion of the modular fence unit 100. A collapsing motion is initiated when compressing force is applied to push the hollow posts 102, 104 together, decreasing a relative angle between the outer first support member 120 and the outer second support member 124. Conversely, an opening motion is initiated when a pulling force is applied to pull the hollow posts 102, 104 apart, increasing a relative angle between the outer first support member 120 and the outer second support member 124. The outer support members 120, 124 operably slide to cover their respective inner support members 122, 126 during a collapsing motion of the modular fence unit 100, such that the top and bottom faces of the posts 102, 104 can be kept substantially in parallel to one another without bending the supporting member's 120, 122, 124, 126 or disconnecting the pins 110, 112, 114, 116.

The second type of connecting members are pivotal rail supports 128, 130. A first pivotal rail support 128 is operably fastened at one end to the first pin 110, a second pivotal rail support 130 is operably fastened at one end to the third pin 114, and the respective ends of each pivotal rail support 128, 130 which are not fastened to pins 110, 114, are operably fastened to each other with a fastener 131 such as a pin. The pivotal rail supports 128, 130 provide a maximum allowable distance between the posts 102, 104, where the maximum allowable distance is equal to the connected length of the pivotal rail supports 128, 130 while they are substantially linear to one another and parallel to the ground surface. During a collapsing motion of the modular fence unit 100, the pivotal rail supports 128, 130 each rotate along their respective pins 110, 114 in the direction of the supporting members 120, 122, 124, 126. As a result, the pivotal supports 128, 130 can be stored inside the hollow tube openings 118 during a collapsing of the modular fence unit 100 while allowing the hollow posts 102, 104 to be substantially in contact with one another. The pivotal supports provide the additional benefit of creating a flat upper rail surface to the modular fence unit 100, which is an essential safety and design feature for fencing used in housing or controlling egress of animal groups.

In many instances, it is desirable to prevent modular fence units 100 from partially collapsing or closing during operation. Thus, as shown in FIG. 1, a sliding lock 132 may be positioned surrounding the pivotal supports 128, 130. The sliding lock 132 can be situated on only one pivotal support member 128, 130 in an unlocked position, or it can be situated on both pivotal support members 128, 130 simultaneously in a locked position. While in the locked position, the sliding lock 132 is situated over the operable fastening point between the pivotal support members 128, 130 and prevents either member from rotating. As the pivotal support members 128, 130 are forced into linear alignment by the sliding lock 132, the maximum allowable distance between posts 102, 104 is also maintained during operation. In some embodiments, the sliding lock 132 is a hollow rectangular element in sliding connection with the pivotal support members 128, 130. In other embodiments, sliding lock 132 is another moving mechanism for preventing rotation of the pivotal support members 128, 130.

In order to combine a plurality of modular fence units 100 in connection, a set of female fasteners 108 are located on the external face of the first hollow post 102 opposite to its hollow post opening 118, and a set of male fasteners 106 are located on the external face of the second hollow post 104 opposite to its hollow post opening 118. The set of male fasteners 106 and set of female fasteners 108 allow for connection between two modular fence units 100 at a plurality of connection angles, which allows for a fence to be constructed in a variety of shapes and sizes. In some embodiments, the set of male fasteners 106 and the set of female fasteners 108 are traditional circular fasteners, such as eyebolts, and can be attached and detached as desired for storage and use. In other embodiments, the set of male fasteners 106 and the set of female fasteners 108 can be any type of fasteners or known means of connecting two modular fence units 100 at a plurality of angles.

Figure 2A:
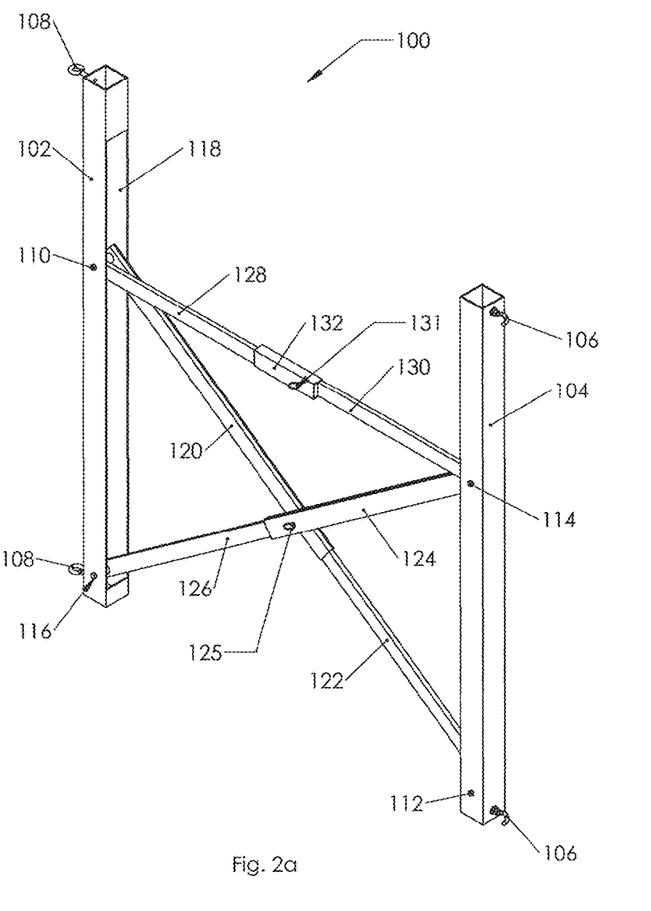
FIGS. 2A to 2D illustrate a collapsing procedure to collapse the fence unit of FIG. 1 from a fully-expanded configuration.
Figure 2B:
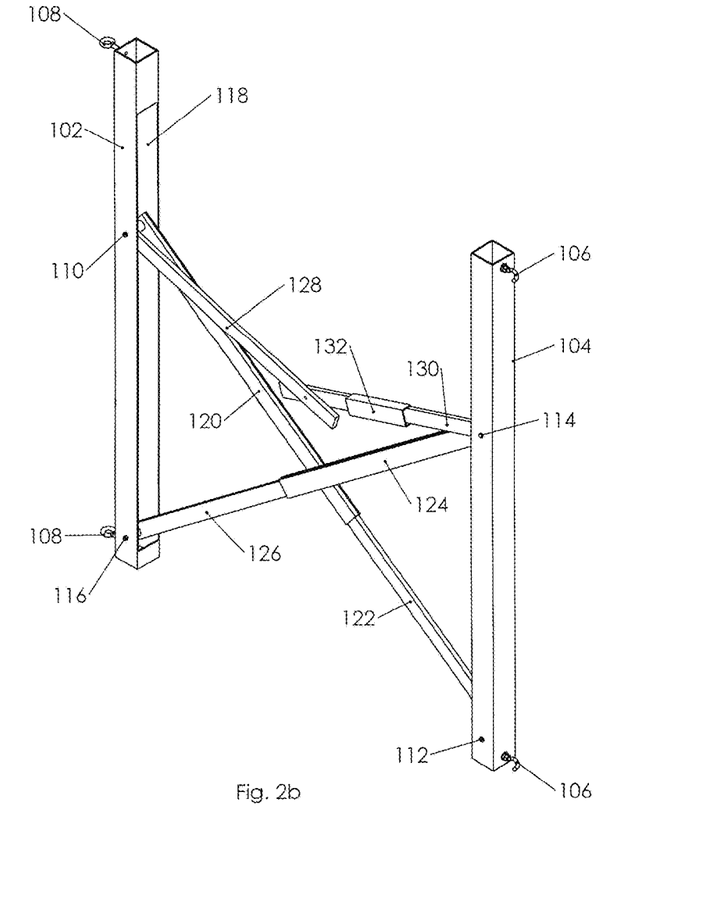
Figure 2C:
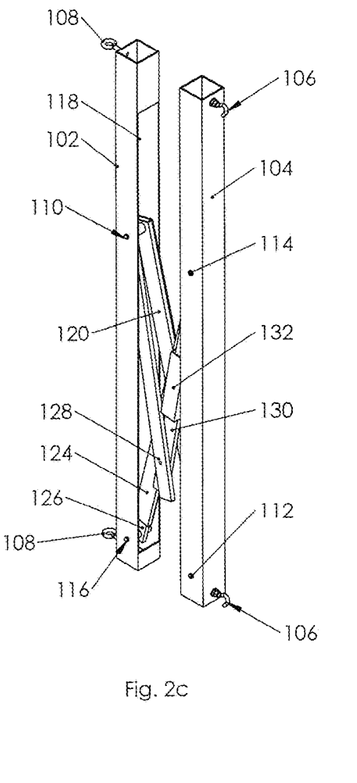
Figure 2D:
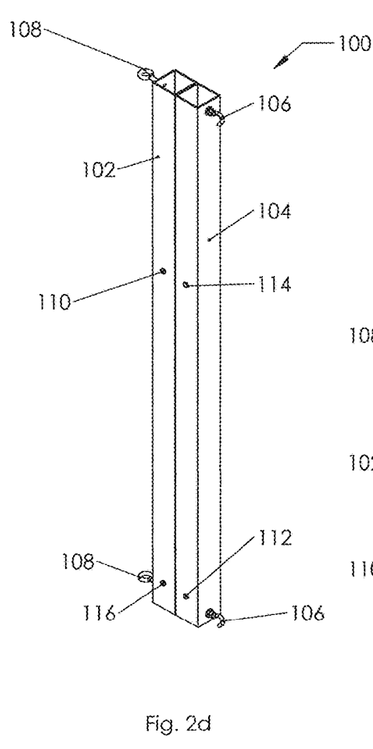

A method of collapsing the modular fence unit 100 is illustrated in FIGS. 2A-2D. A modular fence unit 100 is shown in FIG. 2A in a fully opened configuration with sliding lock 132 engaged. To initiate the collapsing procedure, sliding lock 132 is slid onto one of the pivotal rail supports 128, 130 to unlock the modular fence unit 100, and the pivotal rail supports 128, 130 are rotated into a partially collapsed position, as depicted in FIG. 2B. Next looking to FIG. 2C, compressive force is applied pushing the hollow posts 102, 104 toward one another, causing the support members 120, 122, 124, 126 to rotate in a scissoring/accordion motion in preparation for storage of the support members 120, 122, 124, 126. Finally looking to FIG. 2D, the first hollow post 102 and the second hollow post 104 are pressed substantially in contact with one another, with all supporting members 120, 122, 124, 126, 128, 130, 132 housed within the posts 102, 104. The fully collapsed position of FIG. 2D is a preferred configuration of the modular fence unit 100 for storage and travel, wherein a fully collapsed position is met when the posts 102, 104 are at a minimum distance from one another. The minimum distance between the posts 102, 104 is met when the posts 102, 104 are in substantially direct contact. In some embodiments, the set of male fasteners 106 and the set of female fasteners 108 are optionally removable for storage and transportation.

When one or more modular fence units 100 are transported to a site for deployment, an opening process is performed on each unit. The opening process, also known as a single unit deployment process, follows a reverse order of the collapsing process, in that the posts 102, 104 are pulled into a fully expanded position, which is defined by the maximum allowable distance between the posts 102, 104. After full expansion, the sliding lock 132 is engaged to provide structural support to the modular fence unit 100.

Figure 3:
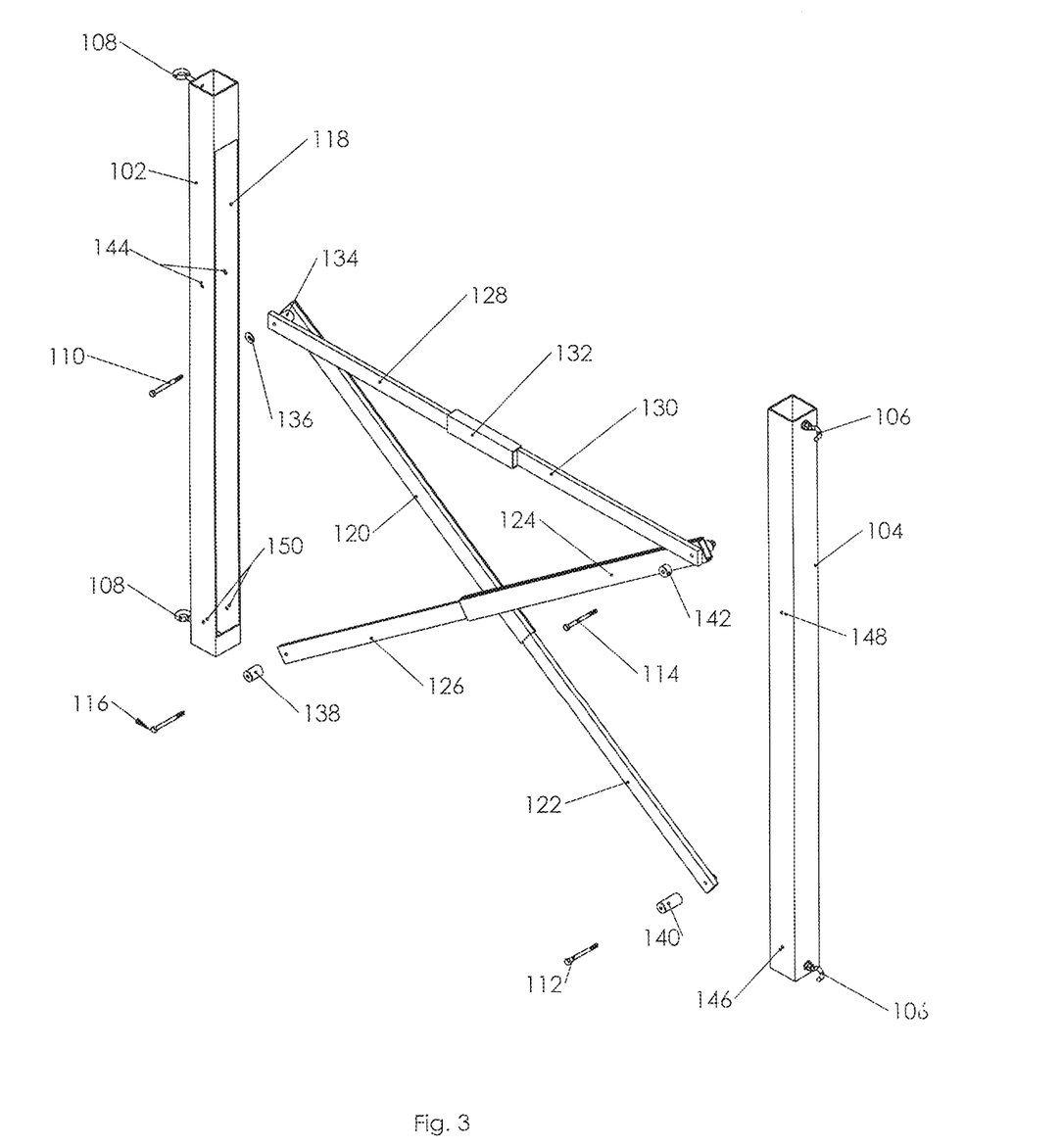
FIG. 3 is an exploded view of the fence unit of FIG. 1.

In order to maintain the rotational pivot points and relative alignment of each supporting member 120, 122, 124, 126, 128, 130, 132, spacers 134, 136, 138, 140, 142 are positioned along the pins 110, 112, 114, 116 to maintain the preferred positioning of each supporting member 120, 122, 124, 126, 128, 130, 132. A first spacer 134 and a second spacer 136 are located on the first pin 110, a third spacer is located on the fourth pin 116, a fourth spacer 140 is located on the second pin 112, and finally a fifth spacer 142 is located on the third pin 114, as shown in FIG. 3. By maintaining the preferred spacing and alignment of each supporting member 120, 122, 124, 126, 128, 130, 132, the modular fence unit 100 is resistant to binding and misalignment related issues which might hinder the unit's opening and collapsing operations. In additional embodiments, spacers 134, 136, 138, 140, 142 can be substituted with other known means for maintaining the relative positioning of each supporting member 120, 122, 124, 126, 128, 130, 132 without diverging from the scope of the disclosed invention.

Figure 4A:
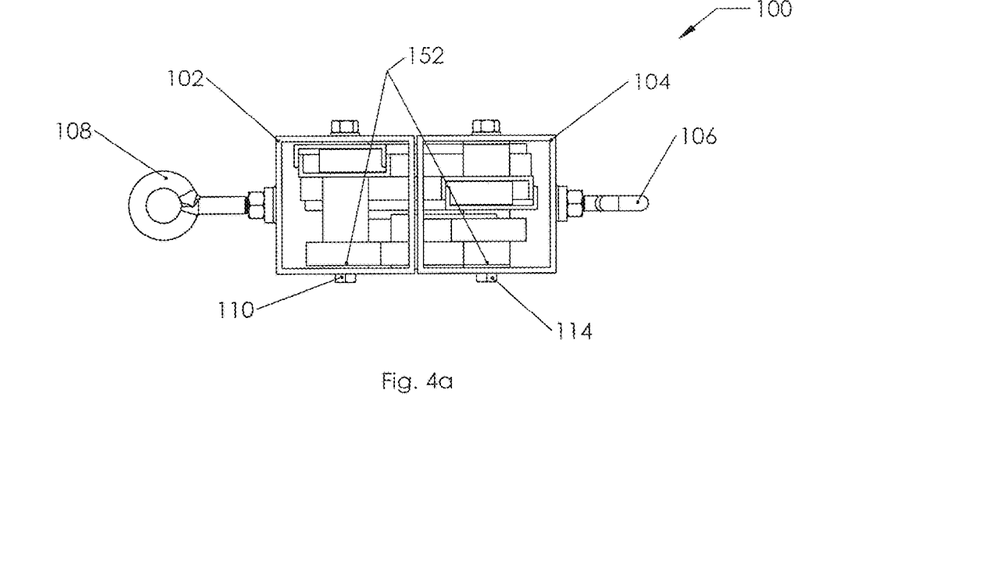
FIG. 4A to 4B are top views of a fence unit of FIG. 1.
Figure 4B:
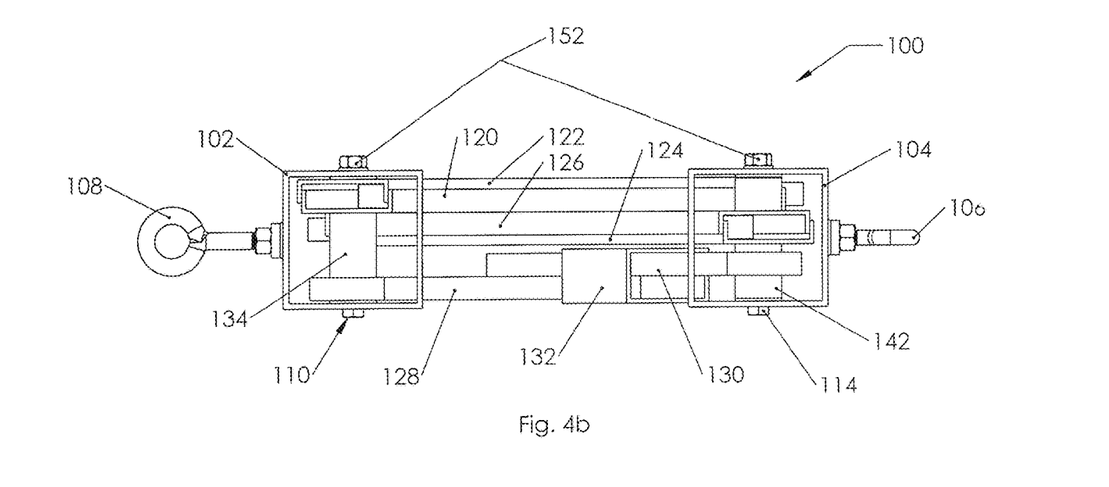

An example embodiment of modular fence unit 100 is shown in FIGS. 4A-4B, wherein the first pin 110 and the third pin 114 (shown) and the second pin 112 and the fourth pin 116 (not shown) are round-bodied bolts secured with lock nuts 152. A top-down view of modular unit 100 in a fully collapsed position is shown in FIG. 4A, and top-down view of modular unit 100 in a partially collapsed position is shown in FIG. 4B. Looking to FIG. 4A, the posts 102, 104 have been described as being substantially in contact with one another while in a collapsed position; however, it is clear from the figure of the example embodiment that a small gap may exist between the first hollow post 102 and the second hollow post 104 while in a fully collapsed position. As used in the context of this disclosure, "substantially in contact" is defined to encompass any distance between the posts 102, 104 which is insignificantly small and insubstantial. A reasonably small clearance/tolerance is necessarily present in the manufacturing of any mechanical assembly, and an insignificantly small gap between posts 102, 104 in a fully collapsed position may exist without deviating from the scope or intent of what is being claimed Bobby the term "substantially in contact".

Figure 5A:
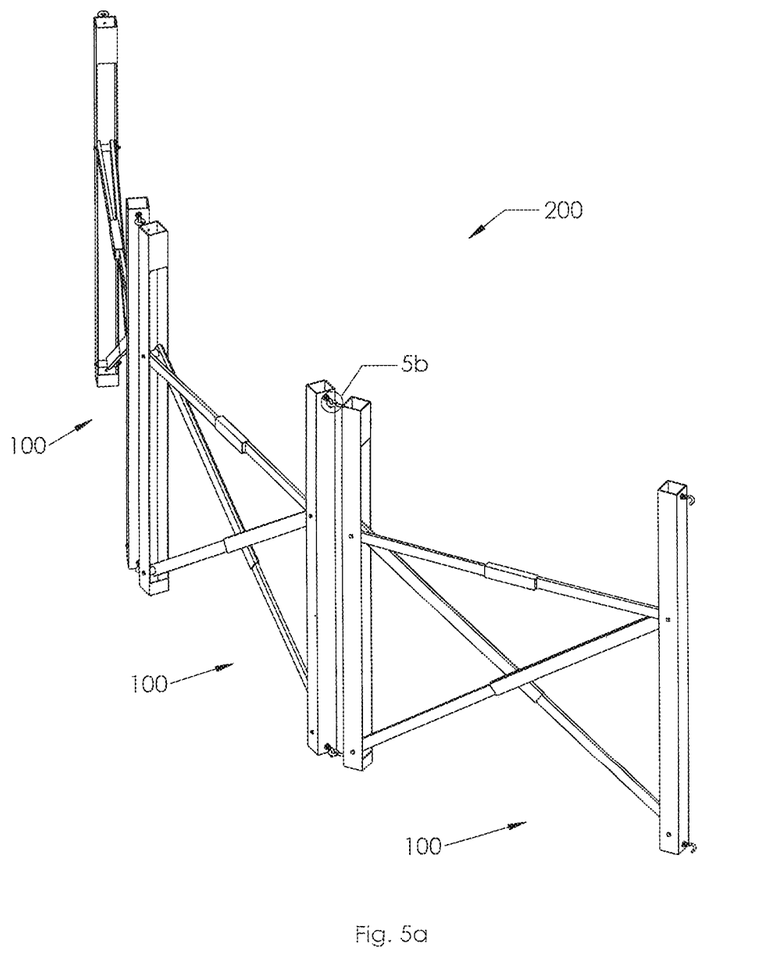
FIG. 5A is an isometric view of an assembled fence.
Figure 5B:
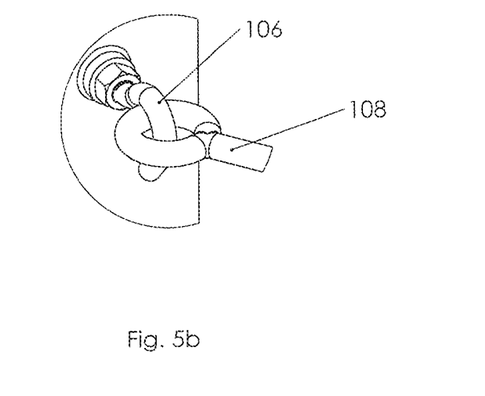
FIG. 5B is a detailed view taken from FIG. 5A.

An essential feature of the disclosed invention is a system and method of assembling a plurality of modular fence units 100 into an assembled fence 200, as shown in FIG. 5A. During operation, a plurality of modular fence units 100 are transported to a preferred site of assembly while in a fully collapsed position as shown in FIGS. 2D and 4A. To create the assembled fence 200, a first modular fence unit 100 is fully expanded and locked with sliding lock 132, followed by a second modular fence unit 100 which is expanded and locked as well. The second modular fence 100 is connected via male-to-female or female-to-male connection with the first modular fence unit 100, using a one respective set of male fasteners 106 or female fasteners 108, depending on direction of assembly (i.e., side of attachment). This connection scheme is shown in FIG. 5B, and the process can be repeated a plurality of times incorporating as many modular fence assemblies 100 as desired.

Figure 6A:
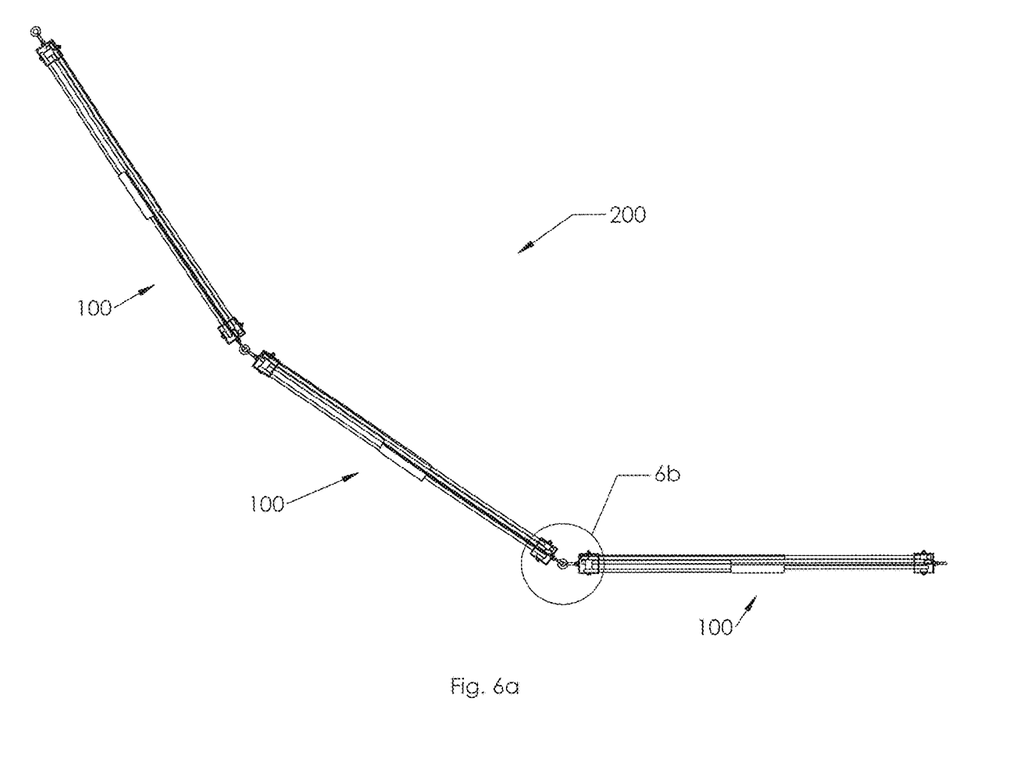
FIG. 6A is a top view of the assembled fence of FIG. 5A.
Figure 6B:
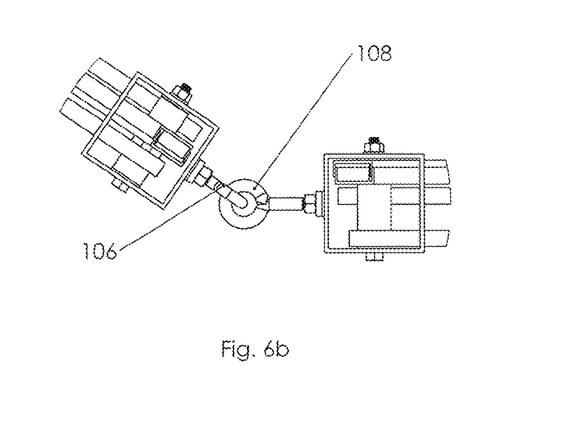
FIG. 6B is a detailed view taken from FIG. 6A.

Each new modular fence assembly 100 can be installed into the assembled fence 200 at a plurality of connection angles, such that a sharp or gradual directional change can occur in the overall assembled fence 200, as shown in FIGS. 6A-6B. The angle between modular fences 100 can additionally be adjusted after assembly, by physically removing or repositioning the modular fence units within the degree of allowance provided by other connected modular fence units 100. By varying the quantity and angular direction of the plurality of modular fence units 100, the assembled fence 200 can be customized into a vast number of shapes and sizes. Likewise, a plurality of assembled fences 200 may be created using a plurality of sets of modular fence units 100, allowing for complex fence shapes and patterns.

In additional embodiments, the set of female fasteners 108 can be of an increased size, allowing for a set of male fasteners 106 from a plurality of modular fence units 100 to be connected to a single set of female fasteners 108. Thus, two or more modular fence units 100 can optionally be connected to the same side of another modular fence unit 100, allowing for fence assemblies 200 with even greater complexity and modularity. In yet further embodiments, additional and/or different male and female connecting fasteners may be connected to the posts 102, 104 of the modular fence units 100 which allow additional connection configurations and/or connection to a variety of other objects, terrain features, and specialized components.

Modular fence unit 100 and its overall assembled fence 200 are particularly suited for housing and controlling egress of an animals in a temporary period of time. Various assembled fences 200 can be configured and assembled to accommodate the space requirements needed for containing various breeds of animals. The dimensions, proportions, and material strengths used for each component of modular fence unit 100 can be selected and modified based on known requirements and desired capabilities for dealing with various forms of animal breeds. Accordingly, a plurality of types of modular fence units 100 may be created to accommodate various fencing needs and the various types may be unique or interchangeable with one another. For example, a particular section of fencing may need to be composed of a stronger material or be larger/longer than another section of an assembled fence 200, thus, various types of modular fence units 100 may be introduced into a single assembled fence 200. As such, a fence type selection process may occur prior to transportation and deployment; wherein at least one type of modular fence unit 100 may be selected, from among a plurality of types, in accordance with one or more required/desired dimensions, proportions, or material strengths of the posts 102, 104 or supporting members 120, 122, 124, 126, 128, 130, 132 for a specific task or for housing/controlling egress of a certain type of livestock.

In further embodiments, other minor modifications may be made to the modular fence unit 100 without deviating from the scope of the disclosed invention. For example, common stabilizing elements, such as rubber pads or feet, may be fixedly attached or otherwise placed in contact with the bottom of the posts 102, 104 to prevent a particular fence assembly 200 from tipping over. Likewise, bracing elements, stabilizers, and other well-known mechanical elements used in the general support and operation of fence assemblies, can be applied and utilized in the assembly of modular fence units 100 without deviating from scope of the claimed invention.

A specialized or general-purpose trailer or a vehicle cargo area may be used for transportation of the modular fence units 100. A deconstruction process can be initiated on an assembled fence 200, wherein each modular fence unit 100 undergoes a breakdown procedure comprising a disconnection of the fasteners 106, 108 from other nearby units 100 and contraction of the posts 102, 104 into a fully collapsed position. The breakdown procedure can optionally further comprise removal of the fasteners 106, 108. While in a fully collapsed position, a plurality of modular fence units 100 may be stored in a highly space efficient configuration. Modular fence units 100 may be stacked in rows, placed on shelves, or stored in various forms of packaging in tight alignment to one another. With such efficient storage configurations, even a fence 200 with a significant perimeter and housing area can be condensed into an exponentially smaller profile that can be transported in an average trailer to another worksite, or efficiently stored for later use. The simplicity and speed of assembly for a fence 200, allows for one mobile supply of modular fence units 100 to replace several traditional fences which are costly and time consuming to construct.

While housing and controlling egress of animals is a preferred use of the modular fence unit 100, there are a plurality of advantageous uses for the unit. In an alternative example use, assembled fences 200 may be used to contain and guide movement of humans, such as temporary fencing to contain crowds and fence-off certain locations during events. In even further embodiments, field of use for the modular fence units 100 can be expanded to provide temporary fencing solutions for: construction, military, first responder, and other business or consumer applications. The modularity, simplicity, and adaptability of the claimed invention is a significant advancement in the field of temporary fencing solutions and overcomes a plurality of limitations and complications of previous temporary fencing products known to one of ordinary skill in the art.

Although specific embodiments have been illustrated and described herein, any arrangement that achieves the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A modular fence unit, comprising:
 a first post and a second post each generally perpendicular to the ground at a use configuration, each post comprising:
  a hollow rectangular tube having a first sidewall with an opening therein and a second sidewall opposite said first sidewall; and
  at least two connection elements mounted within said rectangular tube and accessible through said opening, wherein said connection elements are spaced apart from one another along a length of said rectangular tube such that said post has an upper connection element and a lower connection element;
 a first support member and a second support member diagonally disposed from one another, wherein:
  a first end of said first support member is operably fastened to said upper connection element of said first post;
  a second end of said first support member is operably fastened to said lower connection element of said second post;
  a first end of said second support member is operably fastened to said lower connection element of said first post;
  a second end of said second support member is operably fastened to said upper connection element of said second post;
  said first and second support members are connected via a support member connection fastener which connects said first and second support members at a central point located between said first and second posts, such that said first and second posts are kept substantially parallel to one another and said first and second support members are kept in contact;
  said support members are configured to rotate around each connection element and said respective support member connection fasteners, such that a respective angle between said diagonally disposed support members and said respective support member connection fasteners can be increased or decreased in a scissoring motion;
  increasing said respective angle between said support members causes said first and second posts to contract toward each other until a minimum distance between said posts is reached; and
  decreasing said respective angle between said support members causes said first and second posts to extend away from each other until a maximum distance between said posts is reached;
 an upper rail support comprising:
  a first pivotal support member and second pivotal support member, wherein:
   a first end of said first pivotal support member is operably fastened to said upper connection element of said first post;
   a first end of said second pivotal support member is operably fastened to said upper connection element of said second post;
   a second end of said first pivotal support member and a second end of said second pivotal support member are operably fastened to one another at a central point between said two posts by a rail support connection fastener; and
   said first and second pivotal support members are configured to rotate around each upper connection element and said rail support connection fastener; and
   said maximum distance between said posts is constrained to a distance allowed by said first and second pivotal support members when said first and second pivotal support members are linearly aligned; and
  a locking mechanism which selectively locks rotation of said pivotal support members and prevents said posts from contracting or expanding;
 a fastener connection accessible at said second sidewall of said first post and a fastener connection accessible at said second sidewall of said second post, such that a plurality of modular fence units can be fastened together at one or more angles to form a customizable fence shape; and
 wherein said locking mechanism is a hollow rectangular element slidable from one said pivotal support member to cover both said pivotal support members at said location of said rail support connection fastener when said posts are at said maximum distance away from one another.

2. The modular fence unit of claim 1, wherein a plurality of attributes of said modular fence unit posts can be modified to produce a plurality of modular fence types, said plurality of post attributes comprising dimensions and material strengths of said posts.

3. The modular fence unit of claim 2 wherein a plurality of attributes of said modular fence unit support members and pivotal support members can be modified to produce a plurality of modular fence types, said plurality of support member and pivotal support member attributes comprising dimensions and material properties of said members.

4. The modular fence unit of claim 1, wherein said minimum distance between said posts is a fully collapsed position where said posts are substantially in direct contact.

5. The modular fence unit of claim 4, wherein said modular fence unit in the fully collapsed position can be stacked, such that a plurality of modular fence units can be transported in a space-efficient configuration.

6. The modular fence unit of claim 1, wherein at least one said fastener connection is a circular connection fastener.

7. The modular fence unit of claim 1, wherein at least one of said connection elements is a bolt or pin, which is inserted through a series of spacers and concentric holes on one or more components of said modular fence unit.

* * * * *